US006642329B1

(12) United States Patent
Rath

(10) Patent No.: US 6,642,329 B1
(45) Date of Patent: Nov. 4, 2003

(54) METHOD FOR CONTINUOUS PRODUCTION OF POLYISOBUTENE

(75) Inventor: Hans Peter Rath, Grünstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/089,724

(22) PCT Filed: Oct. 10, 2000

(86) PCT No.: PCT/EP00/09972

§ 371 (c)(1), (2), (4) Date: Apr. 4, 2002

(87) PCT Pub. No.: WO01/27172

PCT Pub. Date: Apr. 19, 2001

(30) Foreign Application Priority Data

Oct. 11, 1999 (DE) ......................... 199 48 947

(51) Int. Cl.[7] ........................... C08F 110/10; C08F 4/14
(52) U.S. Cl. .................. 526/237; 526/64; 526/209; 526/212; 526/348.7
(58) Field of Search ................ 526/209, 212, 526/237, 348.7, 64

(56) References Cited

U.S. PATENT DOCUMENTS

| 4,152,499 A | 5/1979 | Boerzel et al. ............... 526/52 |
|---|---|---|
| 5,286,823 A | 2/1994 | Rath ........................... 526/237 |
| 5,910,550 A * | 6/1999 | Rath ........................... 526/237 |
| 5,962,604 A | 10/1999 | Rath ............................. 526/65 |
| 5,973,219 A | 10/1999 | Colman et al. ............. 585/525 |
| 6,133,209 A | 10/2000 | Rath et al. .................. 508/448 |

FOREIGN PATENT DOCUMENTS

EP 0 145 235 6/1985

OTHER PUBLICATIONS

Puskas "The Nature of the Double Bond in Low Molecular Weight Polyisobutylenes and "Polybutene" Copolymers " J. Polymer Sci. No. 56 (1976) pp. 191–202.

* cited by examiner

*Primary Examiner*—Fred Teskin
(74) *Attorney, Agent, or Firm*—Keil & Weinkauf

(57) ABSTRACT

A process for the continuous preparation of polyisobutene having a number-average molecular weight $\bar{M}_N$ of from 500 to 50,000 and containing at least 50 mol % of terminal double bonds by one-stage or multistage, continuous polymerization of isobutene in the liquid phase in the presence of a catalyst comprising boron trifluoride and at least one oxygen-containing compound at below +40° C., wherein the liquid reaction phase has a viscosity of from 6 to 20 mm$^2$/s (determined according to DIN 51562), at least in the first polymerization stage, is described.

10 Claims, No Drawings

METHOD FOR CONTINUOUS PRODUCTION OF POLYISOBUTENE

The present invention relates to a process for the continuous preparation of polyisobutene having a number average molecular weight of from 500 to 50,000 and containing at least 50 mol % of terminal double bonds by one-stage or multistage, continuous polymerization of isobutene in the liquid phase in the presence of a catalyst comprising boron trifluoride and at least one oxygen-containing compound at below +40° C.

Polyisobutenes are usually prepared by cationic polymerization of isobutene in the liquid phase or in the gas phase in the presence of polymerization catalysts, such as aluminum trichloride or alkylaluminum chlorides. Polyisobutenes thus prepared, have, as a rule, only a low content (less than 10 mol %) of terminal double bonds and a comparatively broad molecular weight distribution, characterized by a dispersity above 2. The dispersity is understood as meaning the quotient of number average molecular weight $\overline{M}_W$ and the number average molecular weight $\overline{M}_N$.

For a number of applications, polyisobutenes having number average molecular weights $\overline{M}_N$ of from 500 to 50,000 Dalton and a high content, i.e. at least 50 mol %, of terminal double bonds are of interest. Such polyisobutenes are referred to as highly reactive polyisobutenes. They are prepared, as a rule, by polymerization of isobutene or isobutene-containing hydrocarbons with $BF_3$-complexes as catalysts. They are used as intermediates for the preparation of additives for lubricants and gels. The molecular structural principle of these additives is based on the linkage of polar structures with the nonpolar, oleophilic polyisobutenyl radical. The linkage of the polar structure with the nonpolar, oleophilic radical is effected by functionalization of the terminal double bond in the polyisobutene, a reactive functionality first being introduced into the polyisobutene, for example by hydroformulation, by epoxidation, by reaction with phenols or by reaction with maleic anhydride, and then being modified in a subsequent reaction, for example by reaction with ammonia, amines, amino alcohols, hemiaminals or polyalkylene oxides, if required under reducing conditions.

Fuel and lubricant additives based on polyisobutene are disclosed, for example, in DE-A 2702604, EP-A 244616, EP-A 277345, EP-A 476485, EP-A 539821, EP-A 568873, WO-92/12221, WO-92/14806, WO-94/24231, DE-A 3611230 and DE-A 19645430. Since, in the abovementioned functionalization reactions, preferably the terminal double bonds (vinylidene double bonds) and, only to a minor extent, the double bonds located further toward the interior of the polymer chain undergo reaction, the content of terminal double bonds in the polyisobutene is an important quality criterion. Regarding the formation of terminal double bonds in the cationic polymerization of isobutene, reference may be made to the equation proposed by Puskas et al., J. Polym. Sci., Symp. 56, (1996) 191 (cf. also WO-96/40808 page 3).

A further, important quality criterion for reactive polyisobutenes is the width of their molecular weight distribution, characterized by the dispersity $\overline{M}_W/\overline{M}_N$. Dispersities $\overline{M}_W/\overline{M}_N$ below 1.8 are desirable.

DE-A 2702604 discloses a process for the preparation of reactive polyisobutenes, in which isobutene is polymerized in the presence of boron trifluoride at from −50° C. to +30° C. Here, polyisobutenes having up to 88 mol % of terminal double bonds are obtained. Polyisobutenes having a dispersity of <1.8 are not obtained by this process.

EP-A 145235 describes the preparation of reactive polyisobutenes containing at least 70 mol % of terminal double bonds. This object is achieved by polymerizing isobutene in the presence of a preformed complex of boron trifluoride and a primary alcohol at from −100° C. to +50° C. with a contact time of more than 8 minutes. It is true that polyisobutenes having a comparatively narrow molecular weight distribution are also obtained by this process. The object of obtaining a narrow molecular weight distribution in combination with a high content of terminal double bonds is achieved here at the expense of a low isobutene conversion, so that the polyisobutenes thus obtained are particularly expensive to prepare.

U.S. Pat. No. 5,286,823 describes a process for the polymerization of isobutene to give highly reactive polyisobutene in the presence of a catalyst comprising boron trifluoride and at least one secondary alcohol of 3 to 20 carbon atoms. In the examples, polyisobutenes have a number average molecular weight $\overline{M}_N$ of from 800 to 2200 Dalton, containing at least 80 mol % of terminal double bonds and having dispersities of from 1.3 to 2.0 are obtained. Polyisobutenes having a specific average molecular weight in combination with simultaneously low dispersity and a high content of terminal double bonds cannot be selectively prepared by this process.

WO-96/40808 discloses a two-stage process for the preparation of highly reactive polyisobutene having number-average molecular weights of 500 to 20,000 Dalton and containing more than 80 mol % of terminal double bonds.

It is an object of the present invention to provide an economical process, which is simple to realize, for the preparation of highly reactive polyisobutene, which process makes it possible to achieve a relative optimum with regard to the content of terminal double bonds for a given composition of the reaction mixture.

We have found, surprisingly, that this object is achieved by a continuous process for the polymerization of isobutene in the liquid phase in the presence of boron trifluoride complex catalysts, if the liquid reaction phase has a viscosity of from 6 to 20 mm$^2$/s (kinematic viscosity, determined according to DIN 51562, part 1–4) under reaction conditions, i.e. at reaction temperature or at the temperature of the reaction phase under reaction conditions.

The present invention accordingly relates to a process for the continuous preparation of polyisobutene having a number-average molecular weight $\overline{M}_N$ of from 500 to 50,000 and containing at least 50 mol % of terminal double bonds by one-stage or multistage, continuous polymerization of isobutene in the liquid phase in the presence of a catalyst comprising boron trifluoride and at least one oxygen-containing compound at below +40° C., wherein the liquid reaction phase has a viscosity of from 6 to 20 mm$^2$/s (determined according to DIN 51562, part 1–4), at least in the first polymerization stage.

Below, liquid reaction phase is understood as meaning the liquid mixture comprising isobutene, polyisobutene, if required solvent and polymerization catalysts, which mixture is present in the polymerization reactor under polymerization conditions. Unless stated otherwise, concentration data are based on the total weight of the liquid reaction phase.

The stated viscosity values correspond to the kinematic viscosity of the liquid reaction phase (liquid reaction mixture) under reaction conditions. Preferably, the novel process is carried out at a viscosity of the liquid reaction phase in the range from 6 to 16, in particular from 7 to 12 mm$^2$/s. It is presumed that, if the viscosity values are too low, the poor solubility of the $BF_3$ catalyst complexes in the reaction medium leads to the formation of a second liquid phase, whereas, if the viscosity values are too high, effective heat removal from the liquid reaction phase is no longer guaranteed. The two effects impair the polymer quality, in particular with regard to the content of terminal double bonds. Preferably, the novel process is carried out at virtually constant kinematic viscosity of the liquid reaction phase.

The viscosity of the liquid reaction phase depends on the reaction temperature, the concentration of polyisobutene in the liquid reaction mixture, the molecular weight of the polyisobutene and the chosen solvent. Thus, the viscosity of the liquid reaction phase increases with decreasing reaction temperature. With increasing polyisobutene concentration in the liquid reaction phase, its viscosity also increases. At a given polyisobutene concentration, the viscosity of the liquid reaction phase also increases with increasing molecular weight of the polyisobutene.

Thus, in the preparation of a polyisobutene having a specific molecular weight, a person skilled in the art can adjust the viscosity of the liquid reaction phase in a simple manner by varying the polymerization temperature of the steady-state concentration of the polyisobutene in the liquid reaction phase or by means of the type of solvent.

The novel process is carried out as a rule at a polymerization temperature of from −60° C. to +40° C., preferably below 10° C., particularly preferably from 0° C. to −40° C., especially from −5° C. to −30° C. If solvents or solvent mixtures having a low viscosity are used, the reaction temperature is preferably chosen to be lower, for example, below −20° C., or the polymerization concentration is increased.

Solvents or solvent mixtures which are suitable for the novel process are those which have a viscosity of less than 16 mm²/s under reaction conditions and which are inert to the reagents used. Suitable solvents are, for example, saturated hydrocarbons, such as n-butane, isobutane, pentanes, hexanes and hexane isomers, e.g. n-hexane, isooctane, cyclobutane or cyclopentane, halogenated hydrocarbons, such as methyl chloride, dichloromethane or trichloromethane, and mixtures of the abovementioned compounds. Other suitable solvents are less reactive olefins, such as propene, 1-butene, cis- and trans-2-butene and pentene mixtures. In addition to n-hexane, industrial hexane mixtures, pentane mixtures or olefin mixtures having aliphatic fractions, $C_4$-hydrocarbon mixtures which may already contain the isobutene required for polymerization, for example steam cracker refined products, $C_4$ cuts from the dehydrogenation of isobutene, as also described, for example, in WO 96/40808 are preferred. Before they are used in the novel process, the solvents are preferably freed from impurities such as water, carboxylic acids or mineral acids, for example by adsorption onto solid adsorbents, such as active carbon, molecular sieves or ion exchangers. However, small amounts of such impurities can be tolerated in the novel process without resulting in critical losses of selectivity in the polymerization.

The concentration of polyisobutene in the liquid reaction mixture may be varied from 15 to 70, preferably from 20 to 60, % by weight, these limits being predetermined by the viscosity of the respective polyisobutene solution. Usually, a very high polyisobutene concentration is chosen in order substantially to rule out effects by impurities in the solvent and to keep the capacity of the plant, i.e. the polymerization reactor, very high. Since the viscosity of a polyisobutene solution at a given concentration increases with increasing molecular weight of the polyisobutene, the polyisobutene concentration is preferably brought to a value of from 40 to 70% by weight, based on the total weight of the reaction phase, in the preparation of polyisobutene having a number average molecular weight $\overline{M}_N$ of from 500 to 5000 and is brought to a correspondingly lower value in the preparation of polyisobutene having a higher molecular weight.

The concentration of the isobutene in the liquid reaction phase is as a rule from 0.5 to 50, preferably from 1 to 20, % by weight, based on the liquid reaction phase. Here and below, the concentration data are always based on the weight of the liquid reaction phase. The fact that the molecular weight of the polyisobutene obtained according to the invention increases with increasing isobutene concentration in the liquid reaction phase is to be taken into account here. In the preparation of polyisobutenes having number average molecular weights $\overline{M}_N$ of from 500 to 5000, an isobutene concentration of preferably from 1 to 20, in particular from 1.5 to 15, especially from 2 to 10% by weight is employed. In the preparation of polyisobutenes having a number average molecular weight $\overline{M}_N$ above 5000 an isobutene concentration of preferably from 4 to 50% by weight is employed. In the novel process, steady-state isobutene concentrations are preferably employed, i.e. the concentration of the polyisobutene in the liquid reaction phase (i.e. in the reactor) is kept virtually constant during the novel process.

The isobutene concentration can be kept constant, for example, by varying the isobutene feed or by adjusting the feed/circulation ratio. Preferably, however, these parameters are kept constant and the isobutene concentration is regulated by manipulating the polymerization rate. The polymerization rate can be manipulated by means of the reaction temperature, i.e. the temperature of the liquid phase in the reactor, by means of the catalyst concentration and by means of the catalyst activity, it being possible to establish the last-mentioned by varying the ratio of boron trifluoride to oxygen-containing compound. Preferably, the reaction rate (and hence the isobutene concentration) are manipulated exclusively by means of the catalyst activity, and all other parameters are kept virtually constant. Here, the catalyst activity decreases with increasing concentration of oxygen-containing compounds, at a constant boron trifluoride concentration.

Suitable starting materials for the novel process are both isobutene itself and isobutene-containing $C_4$-hydrocarbon streams, for example $C_4$ refined products, $C_4$ cuts from the dehydrogenation of isobutene, $C_4$-cuts from steam crackers, and FCC crackers (FCC: fluid catalyzed cracking), provided that they have been substantially freed from 1,3-butadiene contained therein. $C_4$-hydrocarbon streams which are suitable according to the invention contain, as a rule, less than 500 ppm, preferably less than 200 ppm, of butadiene. The presence of the 1-butene, cis-2-butene and trans-2-butene is substantially uncritical for the novel process and does not lead to losses of selectivity. Typically, the concentration in the $C_4$-hydrocarbon streams is from 10 to 60% by weight. At isobutene concentrations of <40% by weight, the isobutene concentration is generally increased to at least 40% by weight by mixing with pure isobutene. When $C_4$ cuts are used as starting material, the hydrocarbons other than isobutene perform the role of an inert solvent. The isobutene feedstock may contain small amounts of contaminants, such as water, carboxylic acids or mineral acids, without there being any critical decrease in the yield or selectivity in the polymerization. This results in a lower alcohol/ether consumption, which changes the abovementioned molar ratio in favor of $BF_3$. However, it is expedient and of advantage to avoid an accumulation of these impurities in the plant by removal of such pollutants from the isobutene-containing feedstock, for example by adsorption onto solid adsorbents, such as active carbon, molecular sieves or ion exchangers.

In the novel process, the polymerization is carried out in the presence of boron trifluoride complex catalysts. These are understood as meaning catalysts comprising boron trifluoride and at least one oxygen-containing compound. Suitable oxygen-containing compounds in addition to water are organic compounds of up to 30 carbon atoms which contain at least one oxygen atom bonded to carbons. Examples of these are $C_1$–$C_{10}$-alkanols and cycloalkanols, $C_2$–$C_{10}$-diols, $C_1$–$C_{20}$-carboxylic acids, $C_4$–$C_{12}$-carboxylic anhydrides and $C_2$–$C_{20}$-dialkyl ethers. Preferred among these are monohydric alkanols of 1 to 20, in particular 1 to 4, carbon atoms, which may, if required, be used together with the $C_1$–$C_{20}$-dialkyl ethers. Molar ratios of boron trifluoride to oxygen-containing compound of from 1:1 to 1:2, in particular from 1:1.1 to 1:1.9, specially from 1:1.2 to 1:1.8, are preferred according to the invention in boron trifluoride complex catalysts. The $BF_3$ concentration in the reactor is as a rule varied in the range from 0.01 to 1, in particular from 0.02 to 0.5, especially from 0.03 to 0.3, % by weight, based on the liquid reaction phase.

In the novel process, the oxygen-containing compound in the boron trifluoride complex catalyst comprises particularly preferably at least one monohydric, secondary alcohol A of 3 to 20 carbon atoms. Examples of suitable secondary alcohols are the following: isopropanol, 2-butanol and furthermore sec-pentanols, sec-hexanols, sec-heptanols, sec-octanols, sec-nonanols, sec-decanols or sec-tridecanols. In addition to monohydric, secondary alcohols, it is also possible, according to the invention, to use (poly)etherols of propene oxide and of butene oxide. 2-Butanol and in particular isopropanol are preferably used.

In the novel process, it has proven particularly advantageous if the oxygen-containing compound comprises, in addition to the secondary alcohol A, a dialkyl ether B of the formula $R^1$—O—$R^2$, where $R^1$ and $R^2$ independently of one another, are each primary or secondary alkyl of 1 to 10 carbon atoms. Preferably, at least one of the radicals $R^1$ and $R^2$ is secondary alkyl and in particular both are secondary alkyl. Specific examples of $R^1$ and $R^2$ are isopropyl, 2-butyl, sec-pentyl, hexyl, heptyl and octyl and $R^2$ may additionally be methyl, ethyl, propyl, butyl, pentyl and hexyl. Particularly preferred dialkyl ethers B are diisopropyl ether, isopropyl 2-butyl ether and bis-2-butyl ether. It is also advantageous if one of the radicals $R^1$ or $R^2$ is a tertiary alkyl radical, e.g. tert-butyl, or 2,4,4-trimethylpent-2-yl.

In the preferred boron trifluoride catalysts, the molar ratio of alcohol A to dialkyl ether B is as a rule from 1:100 to 10:1, preferably from 1:50 to 2:1, very particularly preferably from 1:10 to 1:1.

The boron trifluoride/ether/sec-alcohol complexes are expediently prepared by passing gaseous boron trifluoride into the relevant oxygen-containing compound or preferably into a solution of the relevant oxygen-containing compounds in a solvent. The preparation of these complexes is carried out as a rule at from −60 to +40° C., preferably from −20 to +40° C. Suitable solvents are, for example, hydrocarbons, such as pentane, hexane, isooctane, or halogenated hydrocarbons, such as methylene chloride or chloroform.

The boron trifluoride complexes can be preformed in separate reactors before they are used in the novel process, stored temporarily after their formation and metered into the polymerization apparatus as required. The activity of the catalyst can be adjusted by the addition of further oxygen-containing compounds.

In another, preferred variant, the boron trifluoride complexes are produced in situ in the polymerization apparatus. In this procedure, the relevant oxygen-containing compound, if required together with a solvent, is fed into the polymerization apparatus and boron trifluoride is dispersed in the required amount in this mixture of the reactants. The boron trifluoride and the oxygen-containing compound react to give the boron trifluoride complex. Instead of an additional solvent, isobutene or the reaction mixture comprising unconverted isobutene and polyisobutene may act as a solvent in the in situ production of the boron trifluoride catalyst complex. If the reaction mixture of polyisobutene-containing isobutene serves as a solvent, the isobutene is of course generally not completely reacted, and expediently the partial isobutene conversion of not more than 80%, preferably not more than 70%, is established.

In a preferred embodiment, a complex of dialkyl ether B and $BF_3$ is first prepared separately or in a solvent feed (which in this case contains no isobutene) to the reactor and is combined with a secondary alcohol A only thereafter in the complex feed or solvent feed to the reactor in the reactor itself. Thus, the energy of the complex formation can be removed without harmful byproduct formation during the production of the alcohol complex.

Moreover, this procedure permits simple manipulation of the catalyst activity by the ratio of boron trifluoride to alcohol.

Gaseous boron trifluoride is expediently used as raw material for preparing the boron trifluoride complexes, it being possible to use industrial boron trifluoride, still containing small amounts of sulfur dioxide and $SiF_4$ (purity: 96.5% by weight), but preferably high-purity boron trifluoride (purity: 99.5% by weight).

For the novel preparation of highly reactive polyisobutenes the preformed boron trifluoride complex solution, emulsion/or suspension is thus distributed in the isobutene according to the catalyst requirement, or alternatively the catalyst is reduced in situ in the secondary alcohol/ether-containing isobutene stream by passing in gaseous boron trifluoride.

According to the invention, the polymerization of the isobutene is carried out continuously. For this purpose, conventional reactors, such as tubular reactors, tube-bundle reactors or stirred catalysts are used. Preferably, the novel process is carried out in a loop reactor, i.e. a tubular or tube-bundle reactor having a continuous circulation of the reaction mixture. As a rule, the ratio of feed to circulation is varied from 1:1 to 1:1000, preferably from 1:5 to 1:500, in particular from 1:20 to 1:200 V/V. Of course, the amount of feed after equilibration of the polymerization reaction is the same as the amount of the reaction discharge.

To avoid high local and steady-state catalyst concentrations of the polymerization apparatus, which may give rise to double bond shifts, it is expedient to ensure thorough mixing of all reactants as early as the introduction into the reactor, both when passing preformed catalyst complexes into the reactor and when preparing the boron trifluoride complexes in situ in the reactor. Furthermore, it is expedient to produce turbulent flow of the reaction mixture in the reactor, for which purpose the reactor can be provided, for example, with suitable baffles, such as deflection plates, or the tube cross-section can be dimensioned so that a suitable flow rate results. In the case of tubular or tube-bundle reactors, the ratio of tube length to tube cross-section is from 50 to 5000, in particular from 100 to 2000.

The residence time of the isobutene to be polymerized in the reactor may be from 5 seconds to several hours, a residence time of preferably from 1 to 30, particularly preferably from 2 to 20, minutes being chosen. The gross reaction rate is dependent on the amount, especially the molar ratio, of the complex used. Virtually any gross reaction rate can be established by means of this ratio. The optimum reaction rate is related to the apparatus and depends on the heat removal. Short reaction times are preferred.

Since the polymerization reaction is exothermic, the heat of polymerization is as a rule removed with the aid of a cooling apparatus, which, for example, can be operated with liquid ammonia as coolant. Another possibility of removing the heat of polymerization is by evaporative cooling. The heat liberated is removed by the evaporation of the isobutene and/or other readily volatile components with the isobutene feed stock or any readily volatile solvent, such as ethane, propane or butane, with the result that the temperature remains constant.

In principle, any desired isobutene conversion can be established. However, it is self-evident that, at very low isobutene conversions, the cost-efficiency of the process is doubtful, whereas, at very high isobutene conversions of more than 99%, the danger of double bond shifts or incorporation of oligomers or of n-butene, if this is present in the feed, will constantly increase and shorten reaction times, i.e. improved heat removal, will be absolutely essential. For these reasons, the isobutene conversion is usually from 20 to 99%, and particularly preferably from 90 to 98%. Surprisingly, at these high isobutene conversions and using the novel catalyst system, double bond shifts take place only to a small extent and the polymer obtainable still contains more than 80 mol % of terminal vinylidene groups. To produce polyisobutene having more than 90 mol % of terminal double bonds, an isobutene conversion of up to 99%, preferably from 90 to 99%, in particular from 94 to 99%, is preferably established (with a feed having an isobutene concentration of at least 50% by weight).

The novel process can be carried out in one or more stages, the one-stage procedure being preferred. The reaction conditions described above are initially applicable for the first reaction stage, in which, as a rule, the isobutene is polymerized to a partial conversion of 95% if further polymerization stages are intended. In this case, the second and further polymerization stages are designed as described in WO 96/40808.

For working up, the reaction discharge is expediently passed into a medium which deactivates the polymerization catalyst and thus stops the polymerization. For example, water, ethers, alcohols, nitriles, such as acetonitrile, ammonia or aqueous solutions of mineral bases, such as alkali metal and alkaline earth metal hydroxide solutions, solutions of carbonates of these metals, etc., can be used for this purpose.

In a further working-up operation, the polyisobutene is separated by distillation into unreacted isobutene, solvent, oligomers and polyisobutene, expediently after one or more extractions for removing residual amounts of complex, usually methanol or water washes. The isobutene, the solvent and the oligomers can be recycled to the polymerization apparatus. The polyisobutene desired is present as a bottom product.

The present process permits, in a simple manner, the selective preparation of polyisobutenes having a specific molecular weight, the polyisobutene obtainable in each case permitting both a narrow molecular weight distribution, characterized by an $\overline{M_W}/\overline{M_N} \leq 1.8$, e.g. at an $\overline{M_N}$ of 1000 Dalton, and a content of terminal double bonds (vinylidene groups) of at least 50, in particular at least 80, especially at least 90, mol %, also at high isobutene conversions.

A further advantage of the novel process is simple control. Thus, both the temperature $T_R$ of the liquid reaction phase and its viscosity $\eta_R$ and the isobutene concentration $c_I$ in the liquid reaction phase can be manipulated by means of the activity of the catalyst and hence by the addition of oxygen-containing compound. Thus, if the temperature $T_R$ increases as a result of an increased polymerization rate, this deviation can be corrected by increased addition of oxygen-containing compound. If the viscosity $\eta_R$ decreases owing to a decreasing polyisobutene concentration or an increase in isobutene concentration in the liquid reaction phase, this effect can be compensated by reducing the ratio of $BF_3$ to oxygen-containing compound or, at a constant $BF_3$-concentration, by slowing down the addition of the oxygen-containing compound. The determination of the temperature $T_R$, the viscosity $\eta_R$ (indirectly via the pumping rate of the circulation pump or the pressure drop in the reactor if it is a tubular or tube-bundle reactor) and the isobutene concentration $c_I$ (for example by IR or NIR spectroscopy) is possible online and thus permits coupling with the ratio of $BF_3$ to the oxygen-containing compound, for example via the feed rate of $BF_3$ and/or of the oxygen-containing compound. The novel process is particularly simple if the $BF_3$ concentration and the temperature $T_R$ are kept constant, the latter, for example, by thermostatting or evaporative cooling, and changes in the viscosity $\Delta\eta_R$ or in the isobutene concentration $\Delta c_I$ are compensated by changing the feed rate of the oxygen-containing compound. For example, the quantities $\eta_R$ (via the pumping rate or the pressure drop in the reactor) or $c_I$ (for example, by IR or NIR spectroscopy) determined on line can for this purpose be coupled with the feed rate of the oxygen-containing compound. The feed rate can be controlled, for example, by controllable valves or controllable pumps. The relevant measures are known to a person skilled in the art.

EXAMPLES

Analysis

1. In the context of the present invention, terminal vinylidene groups or terminal double bonds are understood as meaning those double bonds whose position in the polyisobutene macromolecule is described by the formula II

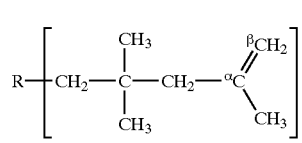

where R is a polyisobutylene radical. The type and amount of the double bonds present in the polyisobutene prepared according to the invention is determined with the aid of the $^{13}C$-NMR spectroscopy method, the two carbon atoms of the terminal double bond which are indicated by a and B in formula IIa being identifiable in the $^{13}C$-NMR spectrum by their signals at the chemical shift of 143.6 and 114.4 ppm, respectively, and the molar fraction of the terminal double bonds relative to other types of double bonds being calculated by determining the peak areas of the signals in relation to the total integral of the olefin signals.

2. The average molar masses ($\overline{M}_N$) of the polymers prepared according to the examples were determined by means of gel permeation chromatography (GPC), standardized polyisobutenes being used for the calibration. From the chromatograms used, the number average molecular weight $\overline{M}_N$ was calculated according to the equation $$\overline{M}_N = \frac{\sum c_i}{\sum \frac{c_i}{M_i}}$$

where $c_i$ is the concentration of the individual polymer species i in the polymer mixture obtained and $M_i$ is the molecular weight of the individual polymer species i. The molecular weight distribution, referred to below as dispersity D, was calculated from the ratio of weight average molecular weight ($\overline{M}_W$) to the number average weight ($\overline{M}_N$) according to the equation $$\frac{\overline{M}_W}{\overline{M}_N} = D$$

The weight-average molecular weight $\overline{M}_W$ was determined from the chromatograms obtained, with the aid of the formula $$\overline{M}_W = \frac{\sum c_i M_i}{\sum c_i}$$

The viscosity was determined according to DIN 51562, sheet 1 to 4, at the respective internal reactor temperature.

Example 1

Preparation of Polyisobutene Having a Molecular Weight $\overline{M}_N$ of 910

The polymerization reactor consists of a Teflon tube having an internal diameter of 6 mm and a length of 7.6 mm and a gear pump which circulates a reactor content at a flow rate of 50 l/h. Tube and pump have an empty volume of 200 ml. Tube and pump head are present in a refrigerating bath which is cooled to −15.5° C. by means of a cryostat. In addition, the reactor also has inlets for solvent and isobutene and an outlet for the reaction product, arranged about 2 cm upstream of the inlet.

The starting materials hexane and isobutene are dried over 3 Å molecular sieve to <3 ppm of water and fed to the reactor via a 2 mm capillary, which is cooled to −15.5° C. Isopropanol, diisopropyl ether (as a solution of 2 M isopropanol and 2 M diisopropyl ether in hexane) and boron trifluoride are fed in with the hexane.

300 g/h of isobutene and 300 g/h of hexane were fed to the reactor. The additional boron trifluoride via the hexane feed was brought to 12.2 mmol/h. The rate of addition of the solution of complexing agent was varied via the hexane feed until a steady-state isobutene concentration had been reached. The reaction temperature was −10° C. The diisopropyl ether feed and isopropyl feed were each 10 mmol/h. The viscosity of the liquid phase present in the reactor was 6.80 mm²/sec (determined at −10° C. according to DIN 51562, sheet 1 to 4). The discharge was washed with water and then degassed under reduced pressure (2 mbar) at 230° C. The polyisobutene thus obtained had a molecular weight $\overline{M}_N$ of 910 Dalton, a dispersity $\overline{M}_W/\overline{M}_N$ of about 1.65 and a content of terminal double bonds of 94.2 mol %.

Comparative Example 1

In the apparatus described in Example 1, 200 g/h isobutene and 400 g of hexane were fed in according to the procedure described there. The steady-state isobutene concentration was 2.0% by weight at an internal reactor temperature of −10° C. and a bath temperature of −13.5° C. The $BF_3$ feed was 12.2 mmol/h. Under these conditions, the diisopropyl ether feed and isopropanol feed were each 9.6 mmol/h. The viscosity of the liquid phase present in the reactor was 2.37 mm²/sec (determined at −10° C.). The polyisobutene obtained after working up had an $\overline{M}_N$ of 820 Dalton and a dispersity of 1.69. The content of terminal double bonds was only 88.3 mol %.

We claim:

1. A process for the continuous preparation of polyisobutene having a number-average molecular weight $\overline{M}_N$ of from 500 to 50,000 and containing at least 50 mol % of terminal double bonds by one-stage or multistage, continuous polymerization of isobutene in the liquid phase in the presence of a catalyst comprising boron trifluoride and at least one oxygen-containing compound at below +40° C., wherein the liquid reaction phase has a viscosity of from 6 to 20 mm²/s (determined according to DIN 51562), at least in the first polymerization stage.

2. A process as claimed in claim 1, wherein the polymerization is carried out at a steady-state isobutene concentration of from 1 to 20% by weight.

3. A process as claimed in claim 1, wherein the polymerization is carried out at constant viscosity.

4. A process as claimed in claim 1, wherein the concentration of the catalyst in the liquid reaction phase, calculated as boron trifluoride, is from 0.01 to 1% by weight.

5. A process as claimed in claim 1, wherein the molar ratio of boron trifluoride to oxygen-containing compound is from 1:1 to 1:2.

6. A process as claimed in claim 1, wherein the oxygen-containing compound comprises at least one secondary alcohol A of 3 to 20 carbon atoms.

7. A process as claimed in claim 6, wherein the oxygen-containing compound additionally comprises at least one dialkyl ether B of the formula $R^1$—O—$R^2$, where $R^1$ and $R^2$, independently of one another, are primary or secondary alkyl radicals of 1 to 10 carbon atoms.

8. A process as claimed in claim 1, wherein the polymerization is carried out in one stage.

9. A process as claimed in claim 1, wherein the polymerization is carried out as a circulation process with a feed/circulation ratio of from 1:5 to 1:500.

10. A process as claimed in claim 1, wherein at least one of the reaction parameters, selected from the temperature $T_R$ of the liquid reaction phase, the viscosity $\eta_R$ of the liquid reaction phase and the isobutene concentration $c_I$ of the liquid reaction phase, is manipulated by the addition of the oxygen-containing compound.

* * * * *